J. W. FROM.
CORN HARVESTER.
APPLICATION FILED OCT. 11, 1917.
1,411,009.
Patented Mar. 28, 1922.
5 SHEETS—SHEET 2.
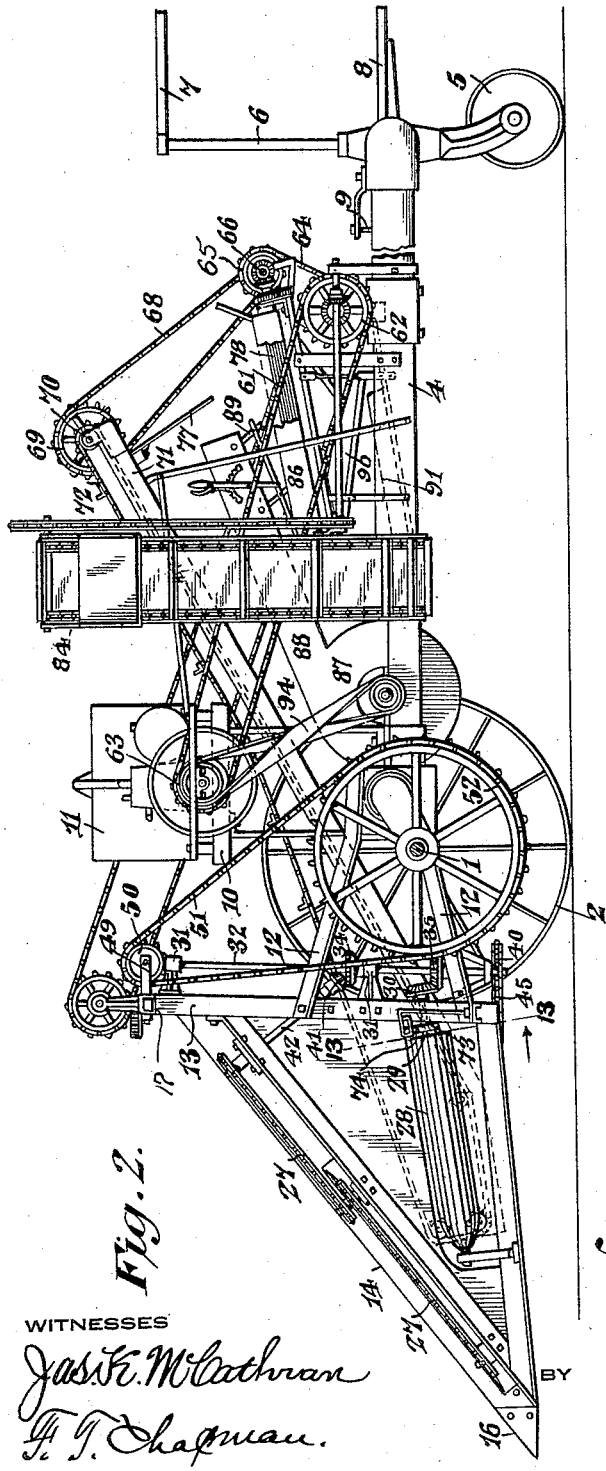
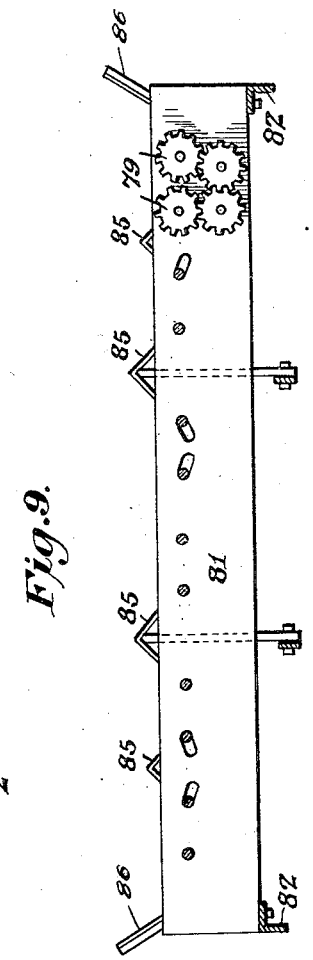
James W. From,
INVENTOR
WITNESSES

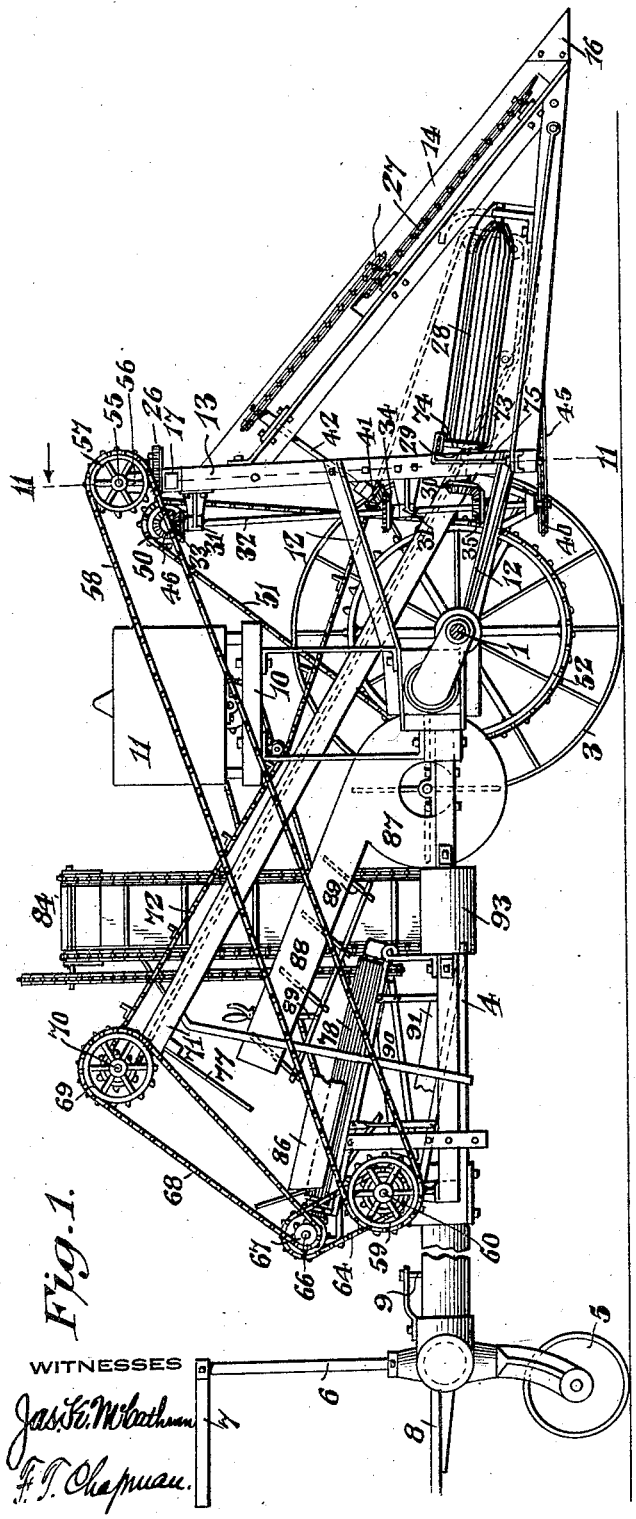

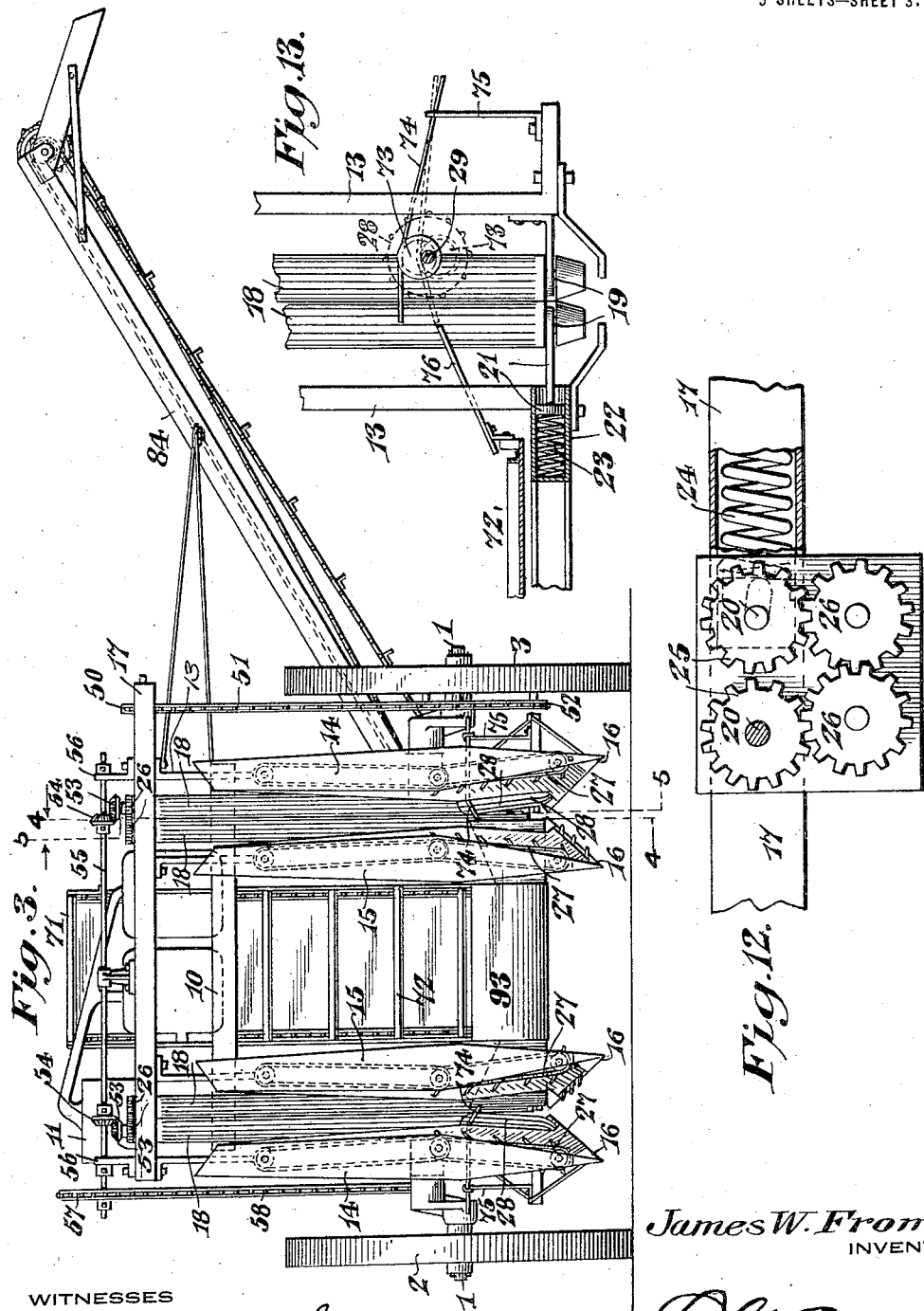

J. W. FROM.
CORN HARVESTER.
APPLICATION FILED OCT. 11, 1917.

1,411,009.

Patented Mar. 28, 1922.

WITNESSES
Jas. H. McCathran
H. T. Chapman.

INVENTOR
James W. From
BY
E. G. Siggers
ATTORNEY

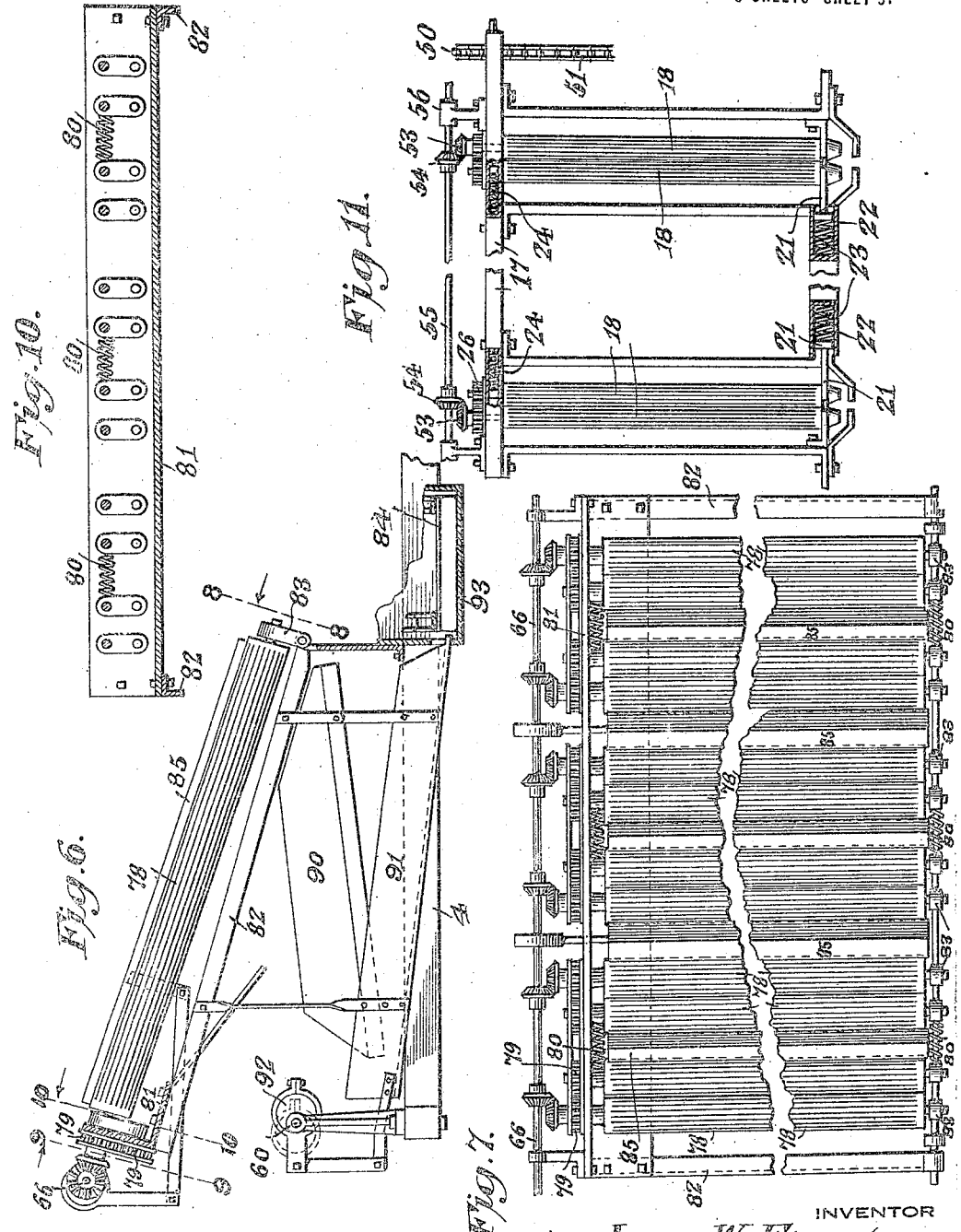

UNITED STATES PATENT OFFICE.

JAMES W. FROM, OF SHELBY, NEBRASKA.

CORN HARVESTER.

1,411,009.  Specification of Letters Patent.  Patented Mar. 28, 1922.

Application filed October 11, 1917. Serial No. 196,037.

*To all whom it may concern:*

Be it known that I, JAMES W. FROM, a citizen of the United States, residing at Shelby, in the county of Polk and State of Nebraska, have invented a new and useful Corn Harvester, of which the following is a specification.

This invention has reference to corn harvesters of the type and of the same general construction as that shown and described in Letters Patent No. 1,175,743, granted to me March 14, 1916.

The object of the invention is to improve the mechanism and operation of the machine and to save material which has heretofore been lost.

The invention comprises among other things means to catch the ears of corn as they fall from the snapping rolls and deliver them onto a conveyer without loss of the corn, and at the same time prevent the corn from choking in front of the snapping rolls and in the feeding mechanism.

The invention further comprises means for catching shelled corn under the husking rolls and directing it to a receptacle, such as a wagon, by means of a conveyer.

In addition to the named improvements, there are other improvements which will hereinafter appear.

The invention will be best understood from a consideration of the following detailed description, taken in connection with the accompanying drawings forming part of this specification, with the further understanding that, while the drawings show a practical form of the invention, the latter is not confined to any strict conformity with the showing of the drawings but may be changed and modified so long as such changes and modifications come within the scope of the appended claims.

In the drawings:

Figure 1 is a side elevation with some parts in section and other parts broken away of the corn harvester or husker of the invention;

Fig. 2 is a similar side elevation, but of the opposite side of the machine;

Fig. 3 is a front elevation;

Fig. 6 is a fragmentary vertical section through a part of the husking mechanism;

Fig. 7 is a plan view of the structure shown in Fig. 6;

Fig. 8 is an elevation as seen along the line 8—8 of Fig. 6;

Fig. 9 is a section on the line 9—9 of Fig. 6;

Fig. 10 is a section on the line 10—10 of Fig. 6;

Fig. 11 is a section on the line 11—11 of Fig. 1;

Fig. 12 is a detail view of the connecting means for the snapping rolls;

Fig. 13 is a section on the line 13—13 of Fig. 2.

Figure 4:
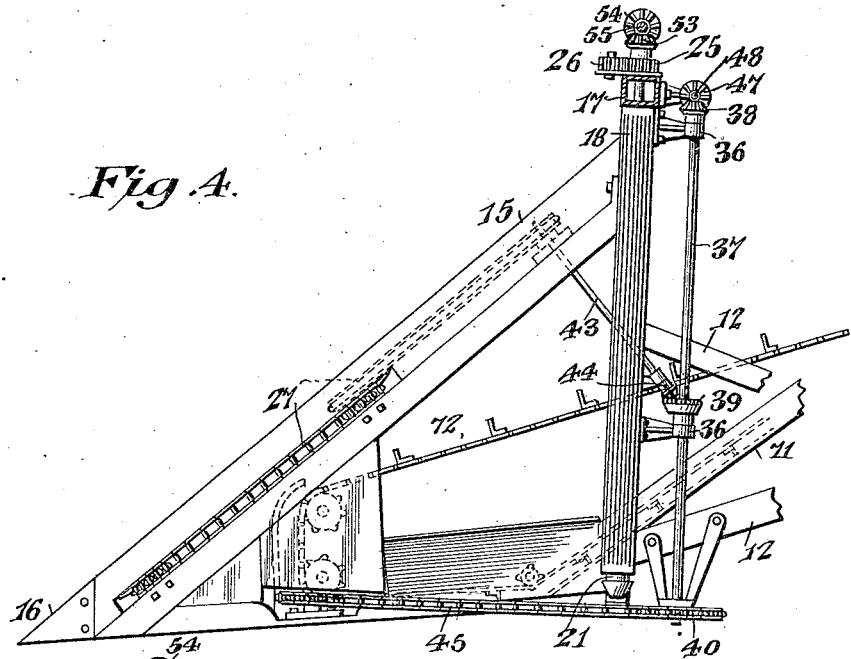
Fig. 4 is a section on the line 4—4 of Fig. 3 looking in the direction of the arrow.
Figure 5:
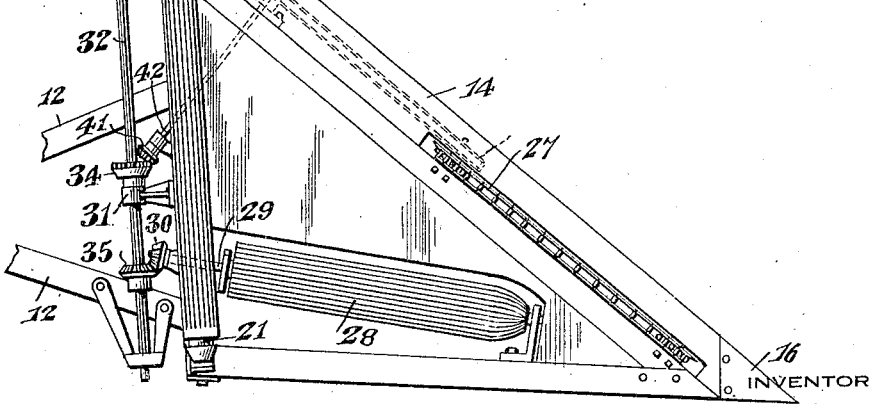
Fig. 5 is a section on the line 5—5 of Fig. 3 looking in the direction of the arrow.

Referring to the drawings, there is shown an axle 1 carried at opposite ends by wheels 2 and 3 respectively. Mounted on the axle is a frame 4 having at the end remote from the axle a caster steering wheel 5 on one end of a post 6 provided with a steering handle 7 located above the operator's platform 8. In the operation of the machine, the steering end is the rear end, and provision is made in the form of a pin 9 or otherwise for the attachment of draft rigging, whereby draft animals may be utilized for propelling the machine similar to the arrangement illustrated in the aforesaid Letters Patent.

Erected on the frame over the axle portion of the vehicle is a platform 10 on which is mounted a prime mover 11 which may be taken as comprising an explosion engine, but no attempt has been made to illustrate any particular form of explosion engine, since there are numerous forms of such power units available for the purpose on the market.

The frame-work of the vehicle and the parts thereof may be made of angle metal or square tubing or other forms of material, but the particular construction of such frame-work is not material to the invention.

Extending forwardly from the part of the frame carrying the axle, which latter may be a divided axle, are divergent bars 12 supporting substantially upright posts 13 of which there may be a pair on opposite sides of the longitudinal center line of the machine.

Each pair of posts carries inner and outer triangular walls 14 and 15 respectively, defining between them a channel.

The walls constitute the gatherers of the corn harvester, and as they may be generally similar to the arrangement shown in the aforesaid Letters Patent, no particular description thereof is deemed necessary.

The entering end of each gatherer formed by the walls 14 and 15 is provided with a guiding nose 16 at the forward end of the corresponding wall. The high ends of the posts 13 are connected together by a transverse beam 17 arranged to carry certain mechanisms to be described. Located between and extending lengthwise of each pair of posts 13 is a pair of snapping rolls 18 which may be similar to snapping rolls as ordinarily constructed. Each roll 18 is upright and has a supporting bearing 19 at the lower end and a pintle 20 at the upper end, the pintle extending through the beam 17. One of the bearings 19 is fixed to a corresponding post 13, while the other is mounted on a plunger or support 21 movable in a guide 22 which may be wholly or in part formed by one of the beams of the main frame, considering such beams as tubular or similarly shaped. The plunger 21 is engaged by a spring 23 in the guide 22 so that one of the rolls 18 is yieldable with respect to the other but has a constant tendency toward it.

The same arrangement is provided at the upper end of the rolls where one of the pintles 20 is engaged by a spring 24 mounted in the beam 17, thereby permitting one of the rolls 18 to move bodily toward and from the other, the mountings being yieldable at both ends of the rolls.

The pintles 20 each carry a pinion 25 meshing with other pinions 26 in turn meshing with each other, so that the rolls 18 are oppositely connected for simultaneous although opposite rotation, while still yieldable to the passage of corn stalks between them without liability of getting out of mesh.

Feed chains 27 are mounted in the gatherers to direct the corn stalks and hold them upright, while being acted upon by the machine. Such features, however, need no special description, since they are shown and described in the aforesaid Letters Patent. Mounted in each outer wall 14 of a gatherer is an elongated roll 28 extending in the same direction as the line of travel of the machine and upwardly slanting at a slight angle to the horizontal. The roll 28 tapers at the front end and is mounted on a shaft or pintle 29 having journal bearings near the ends and at the rear or higher end the pintle carries a bevel gear wheel 30.

Journaled in supports 31 on one of the columns or posts 13 is a substantially upright shaft 32 having bevel gear wheels 33, 34 and 35 at different heights, the bevel gear wheels or pinions 30 and 35 intermeshing.

Journaled in supports 36 on the other one of the posts 13 is a substantially upright shaft 37 carrying bevel gear wheels 38 and 39 and a sprocket wheel 40.

The pinion 34 meshes with another bevel pinion 41 on one end of a shaft 42 driving, through suitable sprocket connections, the corresponding one of the chains 27. A similar shaft 43 having a bevel pinion 44 meshing with the pinion 39 drives the other chain 27.

The wall 15 has mounted in its lower portion an endless feed chain 45 engaging about the sprocket wheel 40. The pinions 33 and 38 mesh with other bevel pinions 46 and 47 on a shaft 48 journaled in supports 49 carried by the posts 13, and this shaft has fast thereon a sprocket wheel 50 engaged by a sprocket chain 51 extending about a sprocket wheel 52 connected to and driven by one of the main wheels of the machine, say the wheel 3, so that as the machine travels over the ground motion is imparted to the various feed chains in the gatherers.

One of the snapping rolls 18 of each pair has its pintle 20 provided with a bevel pinion 53 meshing with a bevel gear or pinion 54 mounted on a shaft 55 extending crosswise of the machine and supported by journal bearings 56 erected on the beam 17. Also fast on the shaft 55 is a sprocket wheel 57 about which there extends a sprocket chain 58 in turn extending toward the rear of the machine where it is carried about a sprocket wheel 59 on a shaft 60 suitably journaled on the frame of the machine and utilized for the actuation of certain parts to be described.

The shaft 60 is driven by a sprocket chain 61 passing about a sprocket wheel 62 on the shaft 60 and also about another sprocket wheel 63 on the power shaft of the engine 11. Another sprocket chain 64 driven by the shaft 60 engages about a sprocket wheel 65 on another shaft 66 on which in turn there is mounted another sprocket wheel 67 connected by still another sprocket chain 68 to a sprocket wheel 69 on another shaft 70 journaled at the upper end of an inclined conveyer 71.

Traversing the body of the conveyer 71 is a conveyer belt 72 driven by the shaft 70 and which may correspond to conveyers ordinarily employed, and hence needing no description. The conveyer 71 with its belt 72 extends lengthwise through the middle portion of the machine to a low point between the gatherers and close to the receiving ends of the latter. On the shaft 29 of each roll 28 there is mounted a cam 73 supporting one end of an agitator 74, which agitator has its other end loosely mounted in an upright support 75 so that as the roll 28 rotates the agitator is given a corresponding up and down movement. This agitator is located close to the lower portions of the snapping rolls and adjacent to a slanting platform 76 delivering onto the conveyer belt 72, the arrangement being such that one pair of snapping rolls 18 delivers onto one side of the conveyer belt 72 and the other pair of snapping rolls delivers onto the other side of the conveyer belt 72. In this way, the snapping rolls are cleared from the snapped corn and choking is prevented, while all particles of corn which would otherwise be lost are delivered to the conveyer.

At the rear end of the conveyer 71 is a delivery chute 77. Underlying the delivery end of the chute 77 is a series of husking rolls 78 arranged in pairs, with the rolls of each pair connected by pinions 79 and urged together by springs 80 so that the rolls will grip the husks of corn and strip them from the ears, while the rolls themselves will yield to the passage of the husks between them. The gears 79 are arranged in a like manner to the gears 25 and need no special description.

The rolls are mounted upon a frame composed of a longitudinal bar 81 and cross bars 82 joined together. The portion of the husking roll frame carrying the gears 79 is the high end of the frame, said frame being a slanting frame, while the other end of the frame has the rolls mounted in bearings 83 sufficiently small in dimensions to offer no interference to the discharge of the husked ears from the rolls onto an elevating conveyer 84 extending transversely of the machine beyond one side thereof, so that the husked ears may be discharged into a wagon or other receptacle.

In order to direct the ears of corn before husking onto the husking rolls, each pair of husking rolls is divided from the neighboring pairs by gable division members 85.

To prevent the ears of corn delivered onto the husking rolls from escaping sidewise therefrom, guards 86 are provided.

In order to force the husks between the husking rolls and so cause the latter to grip them, a blower 87 is provided, and this blower has a neck 88 with adjustable shutters 89 therein for causing currents of air to strike onto the husking rolls and ears of corn thereon. The particular arrangement of the blower is shown and described in my Patent No. 1,092,349, granted April 7, 1914, for a corn husking machine, and therefore no particular description of it is needed in this case.

There is considerable wastage in corn husking machines and especially with respect to the husking rolls, because of the grains of corn which become loosened either before or when the ears of corn reach the husking rolls. To save such loose grain, a screen 90 and pan 91 are located beneath the husking rolls and are agitated by eccentric connections 92 having the eccentrics mounted on the shaft 60. The lower pan 91 discharges into a boxing 93 from which the conveyer 84 rises.

The blower 87 is driven by a belt 94 receiving motion from the engine 11.

When the machine is propelled along a field of corn by means of draft animals, the stalks of corn pass into the gatherers and the ears of corn are snapped from the stalks in the usual manner, the rolls 28 keeping the snapping rolls clear from clogging. The rolls 28 are longitudinally ribbed, and on rotation serve to agitate the corn falling on them, at the same time that the cams 73 on the shafts 29 of the rolls 28 cause the actuation of the agitators 74. The rolls 28 may therefore be termed agitator rolls. The ears with the husks on are then elevated to the rear of the machine and dropped onto the husking rolls where the husks are removed in a manner set fort in the aforesaid Letters Patent first mentioned, and the husked ears are ultimately delivered into a suitable receptacle by way of the elevating conveyer 84. Wastage is prevented because of the means provided to catch all loose grains of corn reaching and passing through the husking rolls.

All the parts except those having to do with the gathering of the corn are power driven so that the draft animals are relieved from a great portion of the labor.

What is claimed is:

1. A corn harvesting machine including a gatherer with a passageway therethrough, snapping rolls located at the rear end of the passageway, and agitating means constituting the bottom portion of the passageway adjacent to the snapping rolls and having a movement to direct corn falling thereon laterally from the passageway.

2. A corn harvesting machine provided with a gatherer having a passageway therethrough for standing corn, snapping rolls at the rear end of the passageway, another roll at the bottom portion of the passageway adjacent to the snapping rolls and to one side of the path of standing corn through the passageway, and rising and falling means associated with the last named roll, said roll extending lengthwise of the passageway and having means for rotating it in a direction to agitate corn snapped from the stalks and falling thereon.

3. A corn harvesting machine provided with a gatherer having a passageway therethrough for standing corn, snapping rolls at the rear end of the passageway, means at one side of the passageway near the bottom thereof for directing the corn to the snapping rolls, and a roll on one side of and extending lengthwise of the passageway and having means whereby to agitate corn snapped from the stalks and falling toward the bottom of said passageway and with its upper surface rotatable toward the opposite side of the passageway from the roll to direct corn falling on said roll laterally from the passageway.

4. A corn harvesting machine provided with a gatherer having a passageway therethrough for standing corn, snapping rolls at the rear end of the passageway, means in the passageway for directing the corn to the snapping rolls, and a roll on one side of and extending lengthwise of the passageway and provided with means whereby to agitate corn snapped from the stalks and falling toward the bottom of said passageway, said roll tapering towards its forward end and rotatable to move its upper surface toward the opposite side of the passageway to direct corn falling on the roll laterally from the passageway.

5. A corn harvesting machine having a gatherer with a passageway therethrough for standing corn, snapping rolls at the rear end of the passageway, a longitudinally disposed roll on one side of the passageway and rotatable toward the other side, a slanting platform on said other side of the passageway, and reciprocating means extending laterally over the longitudinally disposed roll toward the slanting platform.

6. A corn harvesting machine having a gatherer with a passageway for standing corn, snapping rolls at the rear end of the passageway, means for directing corn to the snapping rolls, a longitudinally disposed slanting roll at one side of and rotatable toward the other side of the passageway, and constructed to agitate material falling thereon and means associated with the roll and located on the said other side of the passageway for directing the snapped corn away from the passageway in a direction laterally to the line of travel of the machine.

7. A corn harvesting machine including a frame provided at opposite sides with gatherers having passageways therethrough for standing corn, a conveyer intermediate of the gatherers, means associated with each gatherer and adjacent to the conveyer for directing snapped corn to the conveyer, and a roll in each gatherer on the side thereof remote from and rotatable toward the conveyer for agitating snapped corn adjacent to the snapping rolls and directing it onto the conveyer.

8. A corn harvesting machine including a frame provided at opposite sides with gatherers having passageways therethrough for standing corn, snapping rolls at the rear end of the passageway of each gatherer, an agitating roll extending lengthwise of each gatherer on the outer side of the passageway therethrough, and rotatable toward the inner side thereof, a conveyer between the gatherers, and other agitating means in each gatherer extending toward the inner side of the passageway therethrough for directing snapped corn onto the conveyer.

9. A corn harvesting machine provided with a gatherer having side walls defining a passageway between them for standing corn, snapping rolls at the rear end of the passageway, corn directing means at high points on each wall, corn directing means at a low point on one wall, and a longitudinally disposed agitating roll on the other wall opposite the corn directing means at the low point on the first wall.

10. A corn harvesting machine provided with a gatherer having a passageway therethrough for standing corn, snapping rolls at the rear end of the passageway, and means for receiving and delivering the snapped corn including a longitudinally disposed roll on one side of the passageway and terminating adjacent to and in front of the snapping rolls, a slanting platform on the other side of the passageway with the slant of the platform lateral to the length of the passageway, a cam carried by the roll, and an agitator adjacent to the snapping rolls and actuated by the cam.

11. A corn harvesting machine provided with gatherers on opposite sides, snapping rolls at the rear ends of the gatherers, means for directing the corn stalks to the gatherers, a longitudinally disposed agitating roll in each gatherer near the bottom thereof, supporting wheels for the machine, and driving connections from the supporting wheels to the corn directing means and the longitudinally disposed rolls, whereby the named parts are actuated by the progressive movement of the machine.

In testimony that I claim the foregoing as my own, I have hereto affixed my signature in the presence of two witnesses.

JAMES W. FROM.

Witnesses:
W. C. COLE,
ARTHUR SCOTT.